United States Patent [19]

Ferm et al.

[11] 4,351,750
[45] Sep. 28, 1982

[54] QUICK-SETTING BITUMINOUS EMULSION COMPOSITIONS

[75] Inventors: Richard L. Ferm, Lafayette; Chester C. Latif, Turlock, both of Calif.

[73] Assignee: Chevron Research Company, San Francisco, Calif.

[21] Appl. No.: 173,232

[22] Filed: Jul. 28, 1980

Related U.S. Application Data

[60] Continuation of Ser. No. 16,653, Mar. 1, 1979, abandoned, which is a division of Ser. No. 255,604, May 22, 1972, Pat. No. 4,193,816, which is a continuation-in-part of Ser. No. 672,746, Oct. 4, 1967, abandoned, and Ser. No. 757,137, Sep. 3, 1968, abandoned, and Ser. No. 68,502, Aug. 31, 1970, abandoned.

[51] Int. Cl.³ .................... C04B 7/356; C08L 95/00
[52] U.S. Cl. ........................................ 524/8; 106/119; 106/177; 106/96; 252/311.5; 524/60
[58] Field of Search .................. 106/96, 119, 277; 252/311.5; 260/28 R, 28.5 A

[56] References Cited

U.S. PATENT DOCUMENTS

| Re. 26,204 | 5/1967 | Young | 259/149 |
|---|---|---|---|
| 2,488,252 | 11/1949 | Wood | 106/96 |
| 2,492,994 | 1/1950 | Harman et al. | 106/273 |
| 2,773,777 | 12/1956 | Alexander et al. | 106/96 |
| 2,862,830 | 12/1958 | Mertens et al. | 106/277 |
| 3,126,292 | 3/1964 | Bottero et al. | 106/277 |
| 3,206,174 | 9/1965 | Young et al. | 259/149 |
| 3,206,319 | 9/1965 | Minnick et al. | 106/119 |
| 3,364,046 | 1/1968 | Hoover | 106/277 |
| 3,513,005 | 5/1970 | Bradshaw et al. | 106/277 |

OTHER PUBLICATIONS

The Asphalt Hand Book, Revised Edition, Asphalt Institute, College Park, Md., Sep. 1960, pp. 60 and 216–218.

*Primary Examiner*—Allan Lieberman
*Attorney, Agent, or Firm*—J. M. Whitney; Q. Todd Dickinson

[57] ABSTRACT

Quick setting, anionic bitumen emulsion compositions, suitable for road paving, recreational surfaces, etc., are formulated by emulsifying the bitumen in water with an ammonium or alkali metal salt of a hydrocarbon-substituted sulfuric, sulfonic, phosphoric or phosphonic acid emulsifier, mixing the emulsion with a fine aggregate and, prior to spreading the aggregate emulsion mixture, introducing an alkaline earth metal set initiator. The resulting composition rapidly breaks to a hard cohesive structure, so as to permit early use by traffic.

13 Claims, No Drawings

QUICK-SETTING BITUMINOUS EMULSION COMPOSITIONS

CROSS REFERENCE TO RELATED APPLICATIONS

This application is a Continuation of U.S. application Ser. No. 16,653, filed Mar. 1, 1979, now abandoned, which is a Divisional of U.S. application Ser. No. 255,604, filed May 22, 1972, which has issued as U.S. Pat. No. 4,193,816, which is a continuation-in-part of U.S. application Ser. No. 672,746, filed Oct. 4, 1967, now abandoned, U.S. application Ser. No. 757,137, filed Sept. 3, 1968, now abandoned, and U.S. application Ser. No. 68,502, filed Aug. 31, 1970, now abandoned.

BACKGROUND OF THE INVENTION

1. Field of the Invention

The ever-increasing traffic and heavy wear to which pavements are exposed aggravates the need for a rapid and efficient means for repairing pavements to a long wearing surface. Heretofore, slurry seals have been widely used to repair pavements, but have been deficient in requiring relatively long times before they hardened to a useful surface. The slurry seals set by evaporation. Therefore, the time could greatly vary depending on the temperature and humidity, as well as other environmental factors.

In addition, the slurry seals were particularly suceptible to rain. If they has not hardened to a cohesive surface, a rainstorm could rapidly wash away or seriously damage the slurry seal pavement. Because of the deficiences of prior slurry seals, they have not found the wide use which their convenience of application would otherwise suggest.

2. Description of the Prior Art

U.S. Pat. No. 3,513,005 describes an anionic slurry seal employing an organic sulfonate surface active agent having an ether linkage. U.S. Pat. Nos. 3,206,174 and Re. 26,204 describe an apparatus and methods for applying slurry seal mixtures. Other patents of interest include U.S. Pat. Nos. 3,206,319; 2,488,252; 2,773,777; and 3,364,046.

SUMMARY

Anionic slurry seal compositions are provided by combining with a suitable aggregate a bitumen in water emulsion, emulsified with an ammonium or alkali metal salt of a hydrocarbon sulfonic, sulfuric, phosphonic or phosphoric acid. Prior to laying of the slurry seal, a small but sufficient amount of a set initiator is added and the slurry seal is spread. The slurry seal composition rapidly sets to a strong cohesive structure, so as to support traffic within a short time.

DESCRIPTION OF THE SPECIFIC EMBODIMENTS

Slurry seal pavements are provided by combining an anionic bitumen emulsion with a mineral or other aggregate in a solids ratio of aggregate to bitumen of greater than 1:1. The aggregate and bitumen emulsion are mixed. Prior to spreading of the mixture, at least about 0.01 weight percent (based on aggregate) of cement or calcium hydroxide is added as a set initiator, the composition totally mixed and then spread within not more than five minutes, more usually not more than two minutes of the addition of the set initiator. Upon spreading, the pavement rapidly sets to a hard cohesive surface which is usable within a short time, although one or two days may be necessary before the pavement reaches its ultimate strength.

By rapidly setting it is intended to indicate an aqueous emulsion which will coagulate more than 2 percent when tested in accordance with method ASTM D-244. This method involves mixing 100 ml. of the bituminous emulsion to be tested with 50 g. of Portland cement for one (1) minute followed by passing the mixture through a No. 14 sieve. The percent coagulation is determined by the amount retained on the sieve.

In preparing the slurry seals, the normal slurry seal equipment may be used as exemplified in U.S. Pat. No. Re. 26,204. Means are provided for mixing the bitumen emulsion and aggregate so as to provide a fairly homogeneous mixture. The mixing normally requires from about 0.5 to 5 minutes, more usually from about 1 to 2 minutes. The set initiator may be introduced at any time prior to the spreading of the slurry seal. Preferably, it is added to the aggregate during the initial wetting of the aggregate and prior to the addition of the bitumen emulsion. The set initiator and aggregate are mixed in order to have the set initiator uniformly distributed throughout the aggregate, followed by addition of the bitumen emulsion with continued mixing.

Depending upon the ultimate use of the subject composition, a variety of aggregates may be employed. Suitable materials include rubber buffings, cut fibers, such as those of bagasse, hemp, organic polymeric fibers, made from polypropylene, polyesters, polyamides, etc.; inorganic materials, such as glass fibers, asbestos, etc.; and mineral aggregates, such as gravel, crushed lava, crushed granite, crushed limestone, sand, etc.

The particle size of the aggregate will vary depending upon the particular use. The particles may range from 1 micron or less to 1 inch or greater. Mixtures containing a large variation of particle sizes are suitable in particular uses. However, when mineral aggregates are used in the slurry seals, the particle size would be that within the ranges normally specified for slurry seals. See the *Asphalt Handbook*, Revised Edition, the Asphalt Institute, College Park, Md., September 1960, pages 60 and 216–218. Normally, the aggegates are of a particle size in the range of from about 4 to passing 200 mesh, U.S. Standard sieve. Usually, the aggregate will be siliceous or calcareous, illustrated by fine sand, crusher dust, crushed granite, etc.

The bitumen emulsion will be present in from about 3 to 150 parts, more usually from about 5 to 100 parts, and preferably from about 10 to 30 parts based on 100 parts of aggregate. In slurry seals, the emulsion will normally be present in from about 15 to 25 parts per 100 parts of aggregate. The emulsion will normally have from about 50 to 70 weight percent, more usually from about 55 to 65 weight percent of bitumen. Any of the paving-type asphalts available in commerce will lend itself as a suitable bitumen. In slurry seals, preferred paving bitumens usually have a penetration at 77° F. of from about 40 to 110. The emulsifier will be present in from about 0.1 to 5, more usually about 0.1 weight percent to 3 weight percent of the emulsion, and preferably from about 0.4 to about 2 weight percent of the emulsion. Other additives may also be present, their amounts varying from about 0.05 to 3 weight percent. The remainder of the emulsion will be water, varying usually from about 25 to 49.9 weight percent.

Included among the other additives which may be present are bentonite, which can be present in from about 0.1 to 1 weight percent and an alkali metal salt of phenol sulfonic acid, e.g., sodium phenol sulfonate, which if present will be in amounts from about 0.1 to about 0.3 weight percent.

The emulsifiers which find use in this invention have the following formula:

$$R-(O)_m-Y(O)_n(OH)_p$$

wherein R is a hydrocarbon (i.e., contains only carbon and hydrogen) group of from 8 to 22 carbon atoms, more usually from 12 to 20 carbon atoms and normally having an average number of carbon atoms in the range of about 14 to 18 and may be aliphatic, alicyclic, aromatic or combinations thereof, e.g., alkaryl or aralkyl.

The aliphatic substituent will normally be alkyl or alkenyl. That is, usually there will be only from about 0 to 1 site of olefinic unsaturation. While acetylenic unsaturation may be present, such compositions are generally not commercially available and to that extent are not preferred. Where the hydrocarbon group has an aromatic ring, it is preferred that it be alkaryl and particularly preferred that it be alkyl benzene. The alkyl groups bonded to the benzene ring will normally be of from 8 to 18 carbon atoms, more usually of from 10 to 16 carbon atoms.

Y will be sulfur or phosphorus, preferably sulfur. The O's stand for their normal meaning—oxygen.

m will be 0 or 1, n will be 1 when Y is phosphorus and 2 when Y is sulfur and p will be 2 when Y is phosphorus and 1 when Y is sulfur. n+p equals 3.

The emulsifiers, therefore, are sulfates, sulfonates, phosphates and phosphonates. They may be used individually or in combination. The preferred emulsifiers are sulfonates which may have anywhere from 0 to 25 mol percent sulfate. In addition, small amounts of hydroxy alkyl sulfonates or phosphonates may be present, depending upon the method of preparation. Usually, these will not exceed 10 mol percent.

The compositions where Y is sulfur will have the following formula:

$$R^1(O)_m\overset{O}{\underset{O}{\overset{\parallel}{\underset{\parallel}{S}}}}OH$$

wherein $R^1$ is hydrocarbon of from 8 to 22 carbon atoms, preferably of from 12 to 20 carbon atoms having an average number of carbon atoms in the range of 14 to 18. The preferred $R^1$ is aliphatic of from 10 to 20 carbon atoms, having an average of from 14 to 18 carbon atoms. m may be 0 to 1 and preferably 0.

Particularly preferred are sulfonates derived from olefins, either obtained from the cracking of wax (see French Pat. No. 1,419,652 granted Oct. 25, 1965 or a bulletin of Chevron Chemical Company, Oronite Division, entitled *Preparation of $C_{15}$-$C_{16}$ Alpha Olefin Sulfonate (AOS)*, published in 1966) or polymerization of ethylene. These compositions are prepared by reaction with sulfur trioxide and cracked wax olefins or polyethylene, followed by neutralization with caustic or potassium hydroxide.

The emulsifiers having Y as phosphorus will have the following formula:

$$R^2(O)_m\overset{O}{\underset{OH}{\overset{\parallel}{P}}}-OH$$

wherein $R^2$ is hydrocarbon of from 8 to 22 carbon atoms, preferably hydrocarbon from 12 to 20 carbon atoms and particularly preferred alkyl, alkenyl or alkylphenyl; m is 0 or 1.

The aliphatic groups may be straight or branched chain but are preferably straight chain. The heteroatom, i.e., oxygen, sulfur or phosphorus may be bonded to a terminal or internal carbon atom, but is preferably bonded to a terminal carbon atom.

The above acids will be present as their alkali metal salts or as their ammonium salts. By ammonium is intended ammonia and lower alkyl substituted amines, the alkyl groups being of from 1 to 3 carbon atoms. The alkali metals are lithium, sodium or potassium, preferably sodium.

The pH of the emulsion will be greater than 7 and usually not greater than 12, more usually in the range of about 8 to 12. The emulsions are prepared in the normal manner, for example, using a colloid mill.

The set initiator will be Portland cement or hydrated lime or mixtures thereof. The amount of the set initiator will usually range from about 0.1 to 5 weight percent based on aggregate, although amounts as low as 0.02 weight percent can be used. Usually, the amount of set initiator will range from about 0.1 to 3 weight percent, more usually from about 0.25 to 2 weight percent. It is found that dehydrated lime is a more effective initiator than the cement and, therefore, the hydrated lime will be used in amounts in the lower portion of the range.

The amount of set initiator will be controlled to some degree by the amount of emulsifier present. There will be at least 0.9 equivalent of calcium per equivalent of emulsifier, more usually at least 1 equivalent of calcium per equivalent of emulsifier. Generally, the amount of set initiator will not exceed about 5 equivalents per equivalent of emulsifier, more usually not exceeding about 3 equivalents per equivalent of emulsifier.

Preferably, during mixing of the aggregate with the set initiator a small amount of water will be added to wet the aggregate. Usually this will not exceed 25 parts per 100 parts of aggregate, and will usually be not less than about 5 parts. Generally, the amount of water will be from 5 to 20 parts and usually from 5 to 12 parts by weight per 100 parts of aggregate.

Once the entire mixture has been combined, the mixture is then rapidly spread onto the surface to be covered. By virtue of the set initiator, rapid setting occurs and the slurry seal surface becomes rain resistant in as short a time as 15 minutes, forming a black cohesive pad. Within from about 15 minutes to about 1 hour, the slurry seal has acquired sufficient tensile strength so as to be opened for light vehicular traffice (automobile).

The following examples are offered by way of illustration and not by way of limitation.

In a representative series of tests illustrating the operation of the invention, about 60 percent by weight of a typical paving asphalt (50–60 Pen. at 77° F.) was emulsified in water, using for its emulsification 0.5 percent by weight of different alpha-olefin sulfonic acids, 0.2 percent by weight of phenol sulfonic acid and 0.06 percent by weight of sodium hydroxide.

In each test, 500 gram samples of two different (silica and limestone) aggregate types and different gradations were employed. The set initiator added was Portland cement. The amount of cement used (0.5 weight percent) was in the preferred range of from about 0.25 to about 2 weight percent by weight. Each aggregate sample was then combined with the emulsion whose weight equaled 25 percent by weight, based on the dry aggregate, and with from about 6 to about 12 percent by weight of water, also based on the weight of the aggregate, the quantity of water depending on whether a coarser or a finer aggregate was employed to prepare the slurry. The slurry was poured to fill a round tin can lid, 15.5 centimeters in diameter and 2 centimeters deep. The rapidity of development of tensile strength in the resulting slurry seal pad was determined by touching the pad's surface with a spatula.

The limestone aggregate was obtained from Rockaway Quarry, Pacifica, Calif. It had a gradation indicated in Table I.

TABLE I

| U.S. Sieve Size | Grams Retained from 200 g. Sample | Weight % Retained |
|---|---|---|
| 4 | 0.0 | 0 |
| 8 | 0.0 | 0 |
| 16 | 61.7 | 30.8 |
| 30 | 48.0 | 24.0 |
| 50 | 30.0 | 15.0 |
| 100 | 19.0 | 9.5 |
| 200 | 9.6 | 4.8 |
| thru 200 | 31.5 | 15.7 |
|  | 199.8 | 99.8 |
|  | Loss: 0.2 gram |  |

Sand equivalent = 81

Granite dust was obtained from the Logan Quarry, Watsonville, Calif. It had a gradiation as indicated in Table II.

TABLE II

| U.S. Sieve Size | Grams Retained from 200 g. Sample | Weight % Retained |
|---|---|---|
| 4 | 0.7 | 0.35 |
| 8 | 7.5 | 3.75 |
| 16 | 33.3 | 16.6 |
| 30 | 35.7 | 17.8 |
| 50 | 32.0 | 16.0 |
| 100 | 29.5 | 14.7 |
| 200 | 21.2 | 10.6 |
| thru 200 | 39.0 | 19.5 |
|  | 198.9 | 99.30 |
|  | Loss: 1.1 grams |  |

Sand equivalent = 61

EXAMPLE 1

63 parts by weight of asphalt was emulsified in water using 0.5 part of $C_{11}$–$C_{14}$ alpha-olefin sulfonic acid, 0.2 percent by weight of phenol sulfonic acid, and 0.06 percent by weight of sodium hydroxide as described hereinabove. On mixing with the aggregate, it was noted that the mixing "pot life" ranged from 1 to 2 minutes. When laid on the substrate, the emulsion rapidly coalesced within 4 to 8 minutes, and the slurry seal set completely as a cohesive tough black surface in about 1 hour.

EXAMPLE 2

Again, 63 parts by weight of asphalt was emulsified as in the preceding test, but this time using 0.5 part of a $C_{15}$–$C_{18}$ alpha-sulfonic acid (average molecular weight 343). Again a satisfactory "pot life" was observed during the mixing with the aggregate. The slurry was completely set in about 1 hour.

EXAMPLE 3

In this case, 0.5 part of a $C_{15}$–$C_{20}$ alpha-olefin sulfonic acid was used, other amounts being as in the two preceding tests. The mixing "pot life" was good, in the order of 2 to 4 minutes. Coalescence of the emulsion and setting of the slurry seal occurred somewhat slower in this case; however, the set was completed to satisfaction in about 1 hour.

EXAMPLE 4

In this test, the alpha-olefin sulfonic acid, used for the emulsification of asphalt as described in the preceding tests, was an equimolar mixture of $C_{11}$–$C_{14}$ and $C_{15}$–$C_{20}$ alpha-olefin sulfonic acid. The mixing "pot life" and the setting times were essentially the same as those observed in Test 2.

The next test is offered to show that, although the addition of adhesion aid to the emulsion is sometimes desirable, particularly in the case of phenol sulfonic acid which may enhance adhesion and facilitates application of the slurry seal, the presence of such aids is optional. Bituminous emulsions formulated according to the invention with the aid of sulfonate emulsifiers, such as alpha-olefin sulfonates, are noted to have a similarly satisfactory extended "pot life" which permits effectively mixing them with the aggregates and applying them to the paved surfaces requiring repair.

EXAMPLE 5

In this test, 63 parts by weight of paving asphalt was emulsified in water with the aid of 0.8 part of alpha $C_{15}$–$C_{18}$ olefin sulfonic acid, using sodium hydroxide as the emulsifying base. The conditions of the test were otherwise the same as indicated in Test 1. No adhesion aids of any kind were present. In mixing with the aggregate, the "pot life" ranged from 1 to 2 minutes. Once applied, the slurry seal set to a good, tough cohesive pad in about 1 hour.

EXAMPLE 6

This test was run for comparison with the results observed in Test 5. The proportions of the components for formulating the slurry seal mix were the same, except for the addition of 0.3 part of phenol sulfonic acid. Again, the "pot life" was of the order of 1 to 3 minutes. The workability of the slurry seal, i.e., ease of pouring out, applying and smoothing, was somewhat improved compared to Test 5. The surfacing set to a tough black pad in 1 hour.

FIELD TEST

In this particular test of the paving mix, prepared in accordance with the invention and carried out in actual practice, a portion of worn road surface, 68 centimeters wide and 12 meters long, was slurry seal-treated using the following mixture:

25 parts of asphalt emulsion,
100 parts of aggregate,
11 parts of slurrying water, and
0.75 part of Portland cement.

The emulsion was one prepared by emulsifying 65 percent by weight of mixed California asphalts having an acid number of 1.5 with 0.5 percent by weight of alpha-olefin sulfonic acid, 0.2 percent by weight of phenol sulfonic acid, and 0.06 percent by weight of sodium hydroxide. The mixture of emulsion and aggregate has a "pot life" of about 3 minutes. It was immediately applied by screeds, and the emulsion coalesced in 4 to 8 minutes. The seal set completely in about 30 minutes as a black tough surface which was then opened to vehicular traffic by automobiles and trucks. After ten weeks, no perceptible damage could be observed over the area, which was a part of the driveway to a petroleum refinery product bulk station with an average hourly heavily laden truck traffic density of 3 to 4 vehicles.

EXAMPLE 7

In a similar manner as in Example 1, 63 parts by weight of asphalt were emulsified in water using 0.5 part of octylphenol acid phosphate as the emulsifier. A "pot life" of 2 minutes was obtained with a resulting cohesive tough, black surface.

EXAMPLE 8

The procedure of Example 7 was repeated, employing as the emulsifier Phosphonol N, which is a complex alkyl phosphoric acid marketed by Sterwin Chemicals, Inc. Again, a 1 minute "pot life" with a resulting tough coating was achieved.

EXAMPLE 9

The procedure of Example 1 was followed, employing as the emulsifier 1.0 percent by weight, Duponol ME, which is sodium lauryl sulfate marketed by E. I. du Pont de Nemours and Company. Excellent "pot life" and a tough cohesive coating were achieved.

PREPARATION OF RECREATIONAL SURFACES WITH QUICK-SETTING ANIONIC EMULSIONS

In a manner similar to the preparation of the slurry seals, a running track base was prepared employing the alpha-olefin sulfonate of Example 1. The solid particulate matter comprised in relation to the total weight of mixture, 28.0 percent of rubber buffings, 28.0 percent sand, and 0.3 percent bentonite clay. 1.15 percent of trisodium phosphate was added 1.6 percent by weight of a synthetic rubber latex emulsion and 0.5 percent by weight of an organic magnesium salt defoamer were employed in the mix. 2.4 percent of hydrated lime was used as the set initiator. The resulting composition had a "pot life" of about 2 minutes and set into a tough elastic film.

It is evident from the above results that the compositions of this invention provide a satisfactory "pot life" for homogeneous mixing of the compositions. Furthermore, once the compositions are spread, they rapidly set to a hard cohesive surface with good adhesion to the aggregate. Thus, the slurry seal covered surfaces may be used shortly after the laying of the slurry seal so as to prevent a minimum of interruption in use of the facility.

We claim:

1. A surfacing composition which rapidly sets to a tough cohesive surface with early development of tensile strength and rain resistance and is prepared by intimately mixing a solid particulate matter, a bituminous emulsion having a pH greater than about 7, and a set initiator in the following proportions: which comprises 100 parts by weight of a solid particulate matter, 0.1 to less than 5 parts by weight of a set initiator which is Portland cement, hydrated lime, or mixtures thereof; and from about 3 to 150 parts of a bituminous emulsion comprising from about 50 to 70 weight percent of a bituminous binder and from about 0.1 to about 3 weight percent of the anionic ammonium or alkali metal emulsifying salt of a compound selected from the group consisting of a hydrocarbyl phosphoric acid, a hydrocarbyl phosphonic acid and mixtures thereof, wherein the hydrocarbyl moiety is from about 8 to 22 carbon atoms.

2. A composition according to claim 1, wherein said emulsifying salt has the following formula:

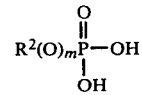

wherein $R^2$ is alkyl, alkenyl or alkylphenyl of from 8 to 24 carbon atoms and m is 0 or 1.

3. The composition according to claim 2 wherein the ammonium salt is a lower alkyl substituted amine wherein the alkyl groups are from 1 to 3 carbon atoms and the alkali metals are selected from the group consisting of lithium, sodium, and potassium.

4. The composition according to claim 3 wherein the pH of the bituminous emulsion is from about pH 7 to about pH 12.

5. The composition according to claim 2 wherein said bituminous emulsion concentration is from about 5 to 100 parts.

6. The composition according to claim 5 wherein the set initiator is present in an amount of from about 0.1 to about 3 weight percent.

7. The composition according to claim 1 further comprising water in an amount equal to or less than about 25 parts per 100 parts of solid particulate matter.

8. The composition according to claim 7 wherein the solid particulate matter is selected from the group consisting of rubber buffings, bagasse, hemp, organic polymeric fibers, inorganic aggregates, mineral aggregates, and mixtures thereof.

9. A process of forming a surfacing composition comprising:
mixing a solid particulate matter;
introducing a composition to said solid particulate matter which comprises about 0.1 to less than 5 parts by weight of a set initiator which is Portland cement, hydrated lime, or mixtures thereof; and about 3 to 150 parts of a bituminous emulsion per 100 parts by weight of solid particulate matter wherein said bituminous emulsion has a pH greater than about 7 and comprises 50 to 70 weight percent of a bituminous binder and from about 0.1 to about 3 weight percent of the anionic ammonium or alkali metal emulsifying salt of a compound selected from the group consisting of a hydrocarbyl phosphonic acid, a hydrocarbyl phosphoric acid, and mixtures thereof; and,
mixing said solid particulate matter and said composition for a sufficient time to form a homogenous mixture.

10. The process according to claim 9 wherein said composition and said solid particulate matter are mixed for about 0.5 to 5 minutes.

11. The process according to claim 9 wherein the set initiator is introduced to and mixed with the solid particulate matter prior to introducing said composition.

12. The process according to claim 11 wherein water in an amount less than about 25 parts per 100 parts of solid particulate matter is added during the mixing of said set initiator and said solid particulate matter.

13. The surfacing compositions produced according to the process of claims 10 or 12.

* * * * *